US008943243B1

(12) United States Patent
Beeson et al.

(10) Patent No.: US 8,943,243 B1
(45) Date of Patent: Jan. 27, 2015

(54) SYSTEM, METHOD AND ARTICLE OF MANUFACTURE FOR MONITORING, CONTROLLING AND IMPROVING STORAGE MEDIA SYSTEM PERFORMANCE BASED ON STORAGE MEDIA DEVICE READ RATE

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: Concurrent Ventures, LLC, Johns Creek, GA (US)

( * ) Notice: Subject to any disclaimer, the term of this patent is extended or adjusted under 35 U.S.C. 154(b) by 0 days.

(21) Appl. No.: 14/099,811

(22) Filed: Dec. 6, 2013

(51) Int. Cl.
*G06F 3/00* (2006.01)
*G06F 3/06* (2006.01)
*G06F 11/34* (2006.01)

(52) U.S. Cl.
CPC .............. *G06F 3/061* (2013.01); *G06F 3/0659* (2013.01); *G06F 3/067* (2013.01); *G06F 11/3433* (2013.01)
USPC ...... 710/60; 710/5; 710/18; 710/74; 711/167; 718/105

(58) Field of Classification Search
None
See application file for complete search history.

(56) References Cited

U.S. PATENT DOCUMENTS

| 5,638,535 | A * | 6/1997 | Rosenthal et al. | 711/165 |
| 5,696,990 | A * | 12/1997 | Rosenthal et al. | 710/29 |
| 5,740,406 | A * | 4/1998 | Rosenthal et al. | 711/169 |
| 5,805,872 | A * | 9/1998 | Bannon | 713/500 |
| 5,805,930 | A * | 9/1998 | Rosenthal et al. | 710/57 |
| 5,924,126 | A * | 7/1999 | Rosenthal et al. | 711/207 |
| 6,081,854 | A * | 6/2000 | Priem et al. | 710/37 |
| 7,802,019 | B2 * | 9/2010 | Shu et al. | 710/8 |
| 7,937,533 | B2 * | 5/2011 | Allen et al. | 711/137 |
| 7,991,923 | B2 * | 8/2011 | Shu et al. | 710/8 |
| 8,015,281 | B2 * | 9/2011 | Baker et al. | 709/224 |
| 8,416,571 | B2 * | 4/2013 | Mizumura et al. | 361/695 |
| 2003/0067975 | A1* | 4/2003 | Yamakura et al. | 375/233 |
| 2009/0150572 | A1* | 6/2009 | Allen et al. | 710/15 |
| 2009/0150622 | A1* | 6/2009 | Allen et al. | 711/154 |
| 2009/0265458 | A1* | 10/2009 | Baker et al. | 709/224 |
| 2010/0010999 | A1* | 1/2010 | Gerovac et al. | 707/9 |
| 2012/0140402 | A1* | 6/2012 | Mizumura et al. | 361/679.33 |
| 2013/0227111 | A1* | 8/2013 | Wright et al. | 709/223 |
| 2013/0227145 | A1* | 8/2013 | Wright et al. | 709/226 |
| 2013/0232261 | A1* | 9/2013 | Wright et al. | 709/224 |

* cited by examiner

*Primary Examiner* — Steven Snyder
(74) *Attorney, Agent, or Firm* — Womble Carlyle Sandridge & Rice LLP

(57) ABSTRACT

An apparent load is determined based on assigning weightings to commands based on various factors including, but not limited to, the limitations of the underlying storage media device(s), where the command queue fullness is viewed from that perspective rather than simply the number of commands outstanding in a storage media device. Also disclosed is the use of a positive bias and a negative bias to artificially influence the apparent load based on the read rate of storage media devices.

18 Claims, 8 Drawing Sheets computing a first apparent load associated with the first storage media device as a function of the set of commands, a first bias associated with execution of the set of commands in the first storage media device, and at least one time factor associated with execution of the set of commands in the first storage media device

116

computing a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device

118

determines a first read rate of the first storage media device and a second read rate of the second storage media device, the second read rate greater than the first read rate

120

negatively biasing the first bias until the first apparent load is greater than the second apparent load

122

executing the set of commands in the second storage media device with higher read rate

124

FIG. 1B computing a first apparent load associated with the first storage media device as a function of the set of commands, a first bias associated with execution of the set of commands in the first storage media device, and at least one time factor associated with execution of the set of commands in the first storage media device

316 computing a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device

318 determining a first read rate of the first storage media device and a second read rate of the second storage media device, the first read rate greater than the second read rate

320 negatively biasing the second bias until the second apparent load is greater than the first apparent load

322 executing the set of commands in the first storage media device with higher read rate

SYSTEM, METHOD AND ARTICLE OF MANUFACTURE FOR MONITORING, CONTROLLING AND IMPROVING STORAGE MEDIA SYSTEM PERFORMANCE BASED ON STORAGE MEDIA DEVICE READ RATE

BACKGROUND OF THE INVENTION

1. Field of Invention

The present invention relates generally to the field of storage systems. More specifically, the present invention is related to a system, method and article of manufacture for monitoring, controlling and improving storage media system performance based on a read rate of storage media devices.

2. Discussion of Related Art

Native Command Queuing (NCQ) is known in the prior art for optimizing the order in which commands (i.e., read and/or write) are executed in a single drive, where the optimization is localized within the single drive. However, the prior art is silent with regards to weighting commands based on various factors including, but not limited to, the limitations of the underlying storage media device(s), where the command queue fullness may be viewed from that perspective rather than simply the number of commands outstanding in a storage media device. Also missing in the prior art is any disclosure for the introduction of positive and/or negative biases to artificially influence an apparent load and/or using such positive and/or negative biases to influence read rate of storage media devices.

Embodiments of the present invention are an improvement over prior art systems and methods.

SUMMARY OF THE INVENTION

The present invention provides a storage system comprising: a plurality of storage media devices comprising at least a first storage media device and a second storage media device; at least one storage controller controlling the first and second storage media devices; a queue storing a set of commands to be executed in the first or second storage media devices; wherein the storage controller: computes a first apparent load associated with the first storage media device as a function of the set of commands, a first bias associated with execution of the set of commands in the first storage media device, and at least one time factor associated with execution of the set of commands in the first storage media device; computes a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determines a first read rate of the first storage media device and a second read rate of the second storage media device, the second read rate greater than the first read rate; negatively biases the first bias until the first apparent load is greater than the second apparent load; and executes the set of commands in the second storage media device with higher read rate.

The present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device; computing a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determines a first read rate of the first storage media device and a second read rate of the second storage media device, the second read rate greater than the first read rate; negatively biasing the first bias until the first apparent load is greater than the second apparent load; and executing the set of commands in the second storage media device with higher read rate.

The present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determine a first read rate of the first storage media device and a second read rate of the second storage media device, the second read rate greater than the first read rate; negatively bias the first bias until the first apparent load is greater than the second apparent load; and execute the set of commands in the second storage media device with higher read rate.

The present invention provides a storage system comprising: a plurality of storage media devices comprising at least a first storage media device and a second storage media device; at least one storage controller controlling the first and second storage media devices; a queue storing a set of commands to be executed in the first or second storage media devices; wherein the storage controller: computes a first apparent load associated with the first storage media device as a function of the set of commands, a first bias associated with execution of the set of commands in the first storage media device, and at least one time factor associated with execution of the set of commands in the first storage media device; computes a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determines a first read rate of the first storage media device and a second read rate of the second storage media device, the second read rate greater than the first read rate; positively biases the second bias until the first apparent load is greater than the second apparent load; and executes the set of commands in the second storage media device with higher read rate.

The present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device; computing a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determining a first read rate of the first storage media device and a second read rate of the second storage media device, the second read rate greater than the first read rate; positively biasing the second bias until the first apparent load is greater than the second apparent load; and executing the set of commands in the second storage media device with higher read rate.

The present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determine a first read rate of the first storage media device and a second read rate of the second storage media device, the second read rate greater than the first read rate; positively bias the second bias until the first apparent load is greater than the second apparent load; and execute the set of commands in the second storage media device with higher read rate.

The present invention provides a storage system comprising: a plurality of storage media devices comprising at least a first storage media device and a second storage media device; at least one storage controller controlling the first and second storage media devices; a queue storing a set of commands to be executed in the first or second storage media devices; wherein the storage controller: computes a first apparent load associated with the first storage media device as a function of the set of commands, a first bias associated with execution of the set of commands in the first storage media device, and at least one time factor associated with execution of the set of commands in the first storage media device; computes a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determines a first read rate of the first storage media device and a second read rate of the second storage media device, the first read rate greater than the second read rate; negatively biases the second bias until the second apparent load is greater than the first apparent load; and executes the set of commands in the first storage media device with higher read rate.

The present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device; computing a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determining a first read rate of the first storage media device and a second read rate of the second storage media device, the first read rate greater than the second read rate; negatively biasing the second bias until the second apparent load is greater than the first apparent load; and executing the set of commands in the first storage media device with higher read rate.

The present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determine a first read rate of the first storage media device and a second read rate of the second storage media device, the first read rate greater than the second read rate; negatively bias the second bias until the second apparent load is greater than the first apparent load; and execute the set of commands in the first storage media device with higher read rate.

The present invention provides a storage system comprising: a plurality of storage media devices comprising at least a first storage media device and a second storage media device; at least one storage controller controlling the first and second storage media devices; a queue storing a set of commands to be executed in the first or second storage media devices; wherein the storage controller: computes a first apparent load associated with the first storage media device as a function of the set of commands, a first bias associated with execution of the set of commands in the first storage media device, and at least one time factor associated with execution of the set of commands in the first storage media device; computes a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determines a first read rate of the first storage media device and a second read rate of the second storage media device, the first read rate greater than the second read rate; positively biases the first bias until the second apparent load is greater than the first apparent load; and executes the set of commands in the first storage media device with higher read rate.

The present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device; computing a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determining a first read rate of the first storage media device and a second read rate of the second storage media device, the first read rate greater than the second read rate; positively biasing the first bias until the second apparent load is greater than the first apparent load; and executing the set of commands in the first storage media device with higher read rate.

The present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determine a first read rate of the first storage media device and a second read rate of the second storage media device, the first read rate greater than the second read rate; positively bias the first bias until the second apparent load is greater than the first apparent load; and execute the set of commands in the first storage media device with higher read rate.

It should be noted that while the specification refers to at least one storage controller, the teachings of the present invention equally apply to a plurality of storage controllers, including multiple, distributed, storage controllers. Also, while, for the sake of simplicity, the system is described as being within a chassis, it should be noted that the entire system need not be co-located within one chassis or physical location, as one or more individual elements may be located as part of a different chassis/location. Additionally, the system may also have parent and child storage controllers, where a parent storage controller makes decisions to balance across child storage controllers, who may then make decisions to balance across their child storage controllers, etc. (eventually reaching storage media devices connected to last storage controller(s) in the chain).

While the specification refers to positive and negative biases as notations to either artificially lower or artificially increase the load, it should be noted that the opposite notation is also within the scope of the present invention (e.g., positive bias referring to artificially increasing the load and negative bias referring to artificially lowering the load).

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 1B, 2B, 3B, and 4B illustrate a method flow chart associated with the various embodiments of the present invention.

DESCRIPTION OF THE PREFERRED EMBODIMENTS

Figure 1A:
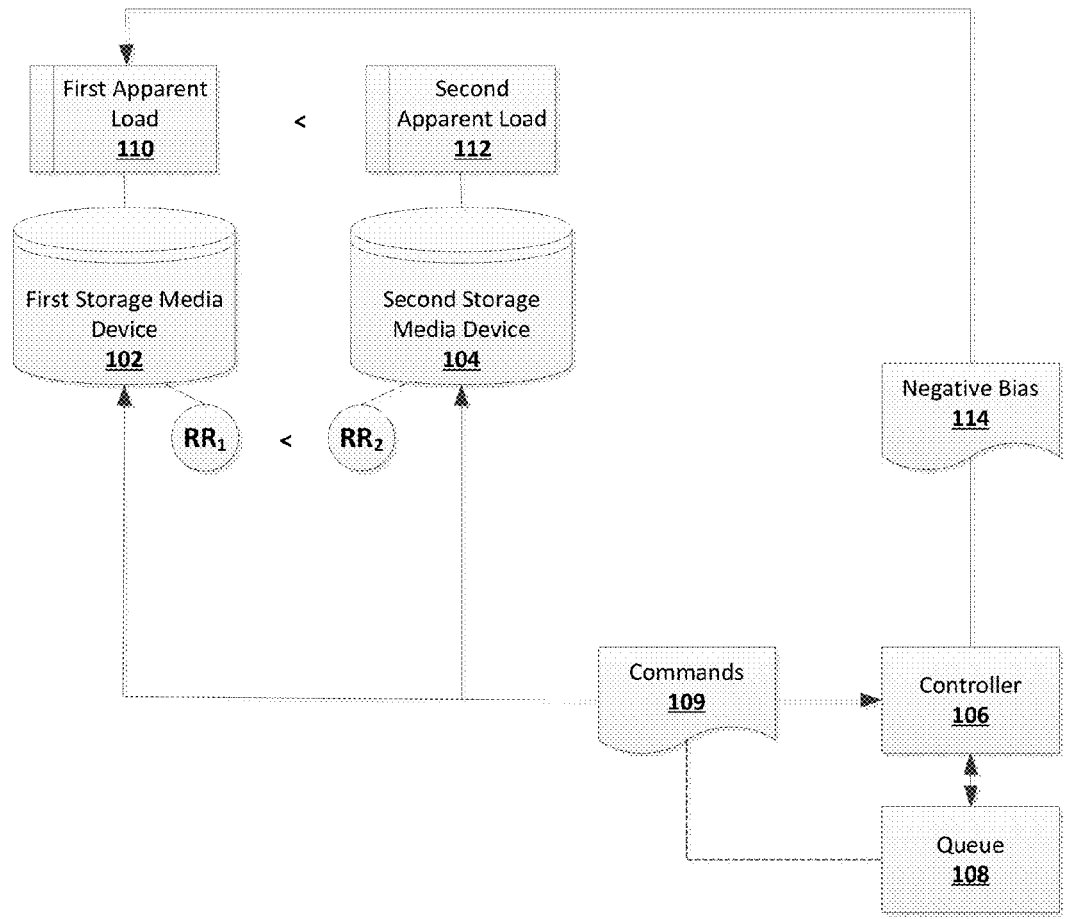
FIGS. 1A, 2A, 3A, and 4A illustrate a system diagram associated with the various embodiments of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Different storage media devices have different features and limitations. For example, rotational hard drives must mechanically move an arm and heads across spinning platters to locate a data block (seek time) and the supported data rates vary with the data's location on the spinning platter such that data closer to the outer diameter of the platter flows faster to and from such spinning platter. In this scenario it is often desirable to minimize the movement of the heads as well as locate data on the outer circumference of the platters.

This invention assigns weightings to commands based on many factors, including but not limited to the limitations of the underlying storage media device. It then views the command queue fullness/load from that perspective rather than simply the number of commands outstanding, to determine the "apparent load" of a storage media device. The invention also discloses the use of a positive bias and a negative bias to artificially influence the apparent load. This bias may be based on what is expected or about to be destined for the storage media device (such as load reservation and load predictions), what is already committed/pending, or what is desired. The difference between a reservation and a commitment is that a reservation can be changed or reallocated based upon new information. Predictions may be based on historical trends or knowledge base of specific types of traffic. Non-limiting prediction examples include:

video streaming, which generally maintains a given average rate;

known or measured bandwidth limitations of either the source or destination, such as destination X cannot accept data faster than 1 Gbps for example; and adjustments made based on the type of traffic, such as its bursty nature.

When the storage system is viewed holistically, one can cause certain storage media devices to get less of the load by negative bias (arbitrarily causing a certain storage media device to "appear" more heavily loaded), thus forcing other storage media devices to pick up additional load. One may also increase a storage media device's load by adding positive bias (arbitrarily causing a certain storage media device to "appear" less heavily loaded). It may be desirable to reduce the load on a storage media device in order to reduce power consumption or operating temperatures. Alternatively, if a given storage media device thermal profile is desired (such as desiring higher operating temperatures for operation in cold weather extremes or space-based equipment), increasing the load and consequently the temperature may be desirable as well. Bias is useful to distribute the data volume across storage media devices of varying capacities to insure any given storage media device does not prematurely fill, be subsequently unavailable for further writes, and thus reduce the number of storage media devices that a given write load may be distributed across. It is also useful to maintain a certain sustainable data rate for a storage system by holding some bandwidth or load capability in reserve, to be used when needed to increase instantaneous data rate in order to maintain that sustainable data rate average (much like a regulator). Without bias, faster storage media devices would naturally get more load by default since they would appear to be less heavily loaded (i.e. they are capable of handling more data faster), but this is not always desired and can be corrected with bias. Bias allows for "traffic shaping" of the data flow, which can intentionally shape the load on the storage media devices as well as the load seen on the attached network to match a desired profile. The Bias may also vary based upon the type of data (i.e. type of data traffic) or to follow a given Quality of Service (QoS) scheme.

In one embodiment, the apparent load may be used solely for monitoring purposes, meaning that it could be used as an indicator of system performance without being used to modify the load in any way.

In another embodiment, apparent load may include the "whole path" from the point where a command is issued all the way to the point at which the response is received. Prior art looks at a storage media device itself, alone, assuming negligible time for transport and movement to/from memory/memories. However, when dealing with a given sustained data rate, the transport layer may be important (such as when through a network or distributed system where the storage controller and storage media devices have physical separation) as well as the movement of data to/from a storage media device and memory/memories. The performance of a storage media device will be impacted if data cannot flow to or be carried away from the storage media device fast enough, a condition not typically under the direct control of the storage media device, which will cause data pushback or starvation. The impact of one or more caches in the path would then be included within the apparent load.

For clarity, the following is a non-limiting apparent load calculation:

$$ApparentLoad = \sum_{i=0}^{N} \frac{M_i * Bias_i}{QueueCapacity}$$

for N commands in the queue
Where $$M = \frac{RequiredSeekTime}{T_{min}} + \frac{T_{cmd}}{T_{min}}$$

$T_{min}$=minimal time possible for any single command for the storage media device, from issuance to completion.

$T_{cmd}$=time for the specific command to issue, from issuance to completion. This is dependent upon the actual command. For example, in some storage media devices, a write may require a different period of time to complete than a read. Also, if the path contains one or more caches, the time to complete the command may vary at different times.

QueueCapacity=the maximum number of commands that the queue can hold.

Bias=the desired artificial influence applied to each command. A number ranging from 0.0→10.0; for example, neutral bias would be 1.0, positive bias would be a value below 1.0 (to artificially lower the apparent load), while negative bias would be a value greater than 1.0 (to artificially increase the apparent load).

RequiredSeekTime=The estimated or actual storage media device seek time, based upon lookup or historical performance, for this command from the previous command.

Both $T_{min}$ and $T_{cmd}$ are system values. These values may vary based on the class of storage media device (such as rotational, solid state, or hybrid). They may be treated as static or dynamic based on measured system characteristics in real-time and/or historical values. Such measurements may include temperature monitoring (when the completion times vary with temperature) or current cache contents. In addition, each specific storage media device to be used in the system may be "qualified" and the values of $T_{min}$ and $T_{cmd}$ determined and used for accesses to that specific storage media device. As an alternative, a sampling of similar storage media devices may be "qualified" and averaged to produce values for that class of storage media device.

It should be note that the time factor as used herein refers to the required seek time, $T_{min}$, $T_{cmd}$, combinations thereof, or functions based on various combinations thereof.

Some non-limiting example usages of the apparent load include, but are not limited to
  reordering commands in a queue;
  influencing the power consumption and thermal profile of a storage media device;
  removing commands from a queue;
  reallocating commands from the queue of one storage media device to another;
  minimizing or maximizing storage media device seek time;
  controlling the fill rate of a storage media device; and/or
  passively monitoring system performance.

In one embodiment, the described storage media device is not a separate physical device, as it may be memory used for storage, embedded within another device.

The present invention provides a storage system comprising: a plurality of storage media devices; at least one storage controller controlling the plurality of storage media devices; a load balancer in communication with the storage controller to balance storage load across the storage media devices; an optional memory shared between the load balancer and the storage controller; and the load balancer receiving a plurality of commands for execution in at least one storage media device among the plurality of storage media devices, storing the commands in the shared memory, assigning either a positive or negative bias to each of the commands; and distributing load amongst the storage media devices as a function of the assigned positive or negative bias.

In one embodiment, as depicted in FIG. 1A, the present invention provides a storage system comprising: a plurality of storage media devices comprising at least a first storage media device 102 and a second storage media device 104; at least one storage controller 106 controlling the first and second storage media devices 102 and 104; a queue 108 storing a set of commands 109 to be executed in the first or second storage media devices 102 or 104; wherein the storage controller 106: computes a first apparent load 110 associated with the first storage media device 102 as a function of the set of commands 109, a first bias associated with execution of the set of commands 109 in the first storage media device 102, and at least one time factor associated with execution of the set of commands 109 in the first storage media device 102; computes a second apparent load 112 associated with the second storage media device 104 as a function of the set of commands 109, a second bias associated with execution of the set of commands 109 in the second storage media device 104, and at least one time factor associated with execution of the set of commands 109 in the second storage media device 104; the first apparent load 110 less than the second apparent load 112 when the first bias and the second bias are set to a neutral, unbiased value indicating potential execution of said set of commands 109 in the first storage media device 102; determines a first read rate, $RR_1$, of the first storage media device 102 and a second read rate, $RR_2$, of the second storage media device 104, the second read rate, $RR_2$, greater than the first read rate, $RR_1$; negatively biases 114 the first bias until the first apparent load 110 is greater than the second apparent load 112; and executes the set of commands 109 in the second storage media device 104 with higher read rate.

In another embodiment, as depicted in FIG. 1B, the present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device—step 116; computing a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device—step 118; determines a first read rate of the first storage media device and a second read rate of the second storage media device, the second read rate greater than the first read rate—step 120; negatively biasing the first bias until the first apparent load is greater than the second apparent load—step 122; and executing the set of commands in the second storage media device with higher read rate—step 124.

In another embodiment, the present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determine a first read rate of the first storage media device and a second read rate of the second storage media device, the second read rate greater than the first read rate; negatively bias the first bias until the first apparent load is greater than the second apparent load; and execute the set of commands in the second storage media device with higher read rate.

Figure 2A:
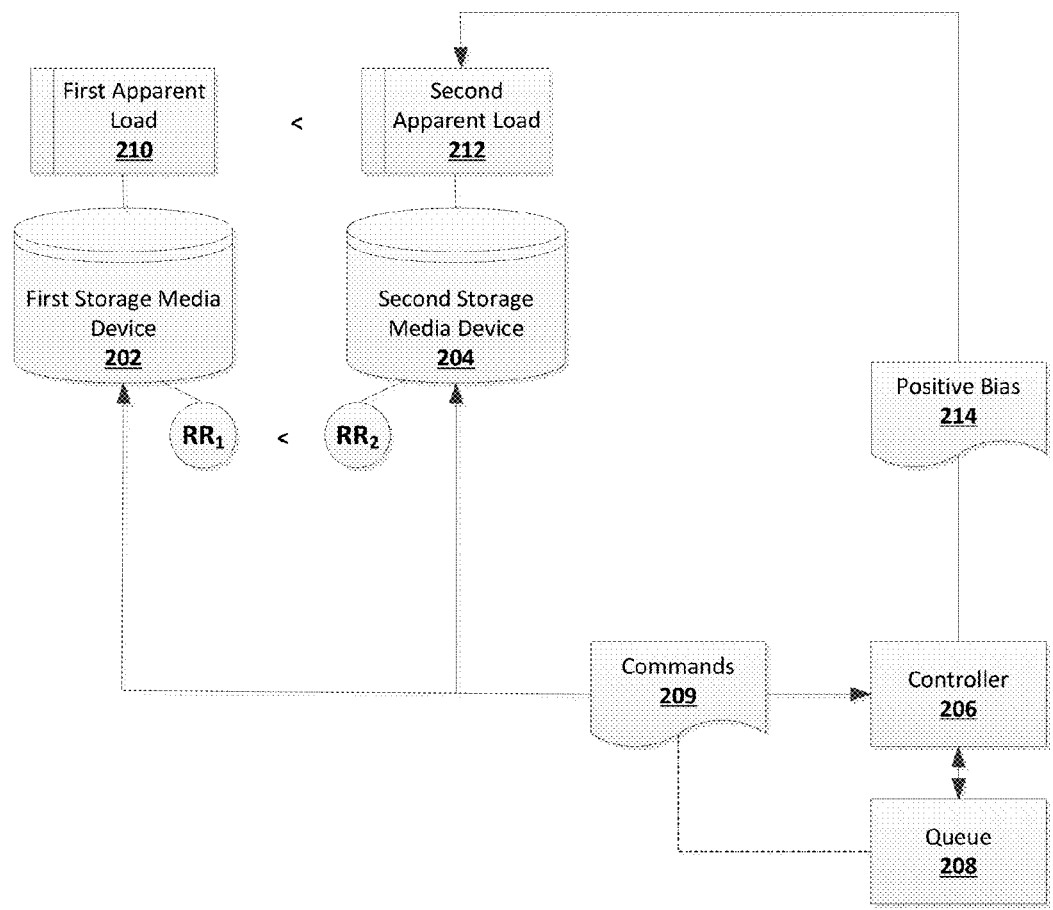

In another embodiment, as depicted in FIG. 2A, the present invention provides a storage system comprising: a plurality of storage media devices comprising at least a first storage media device 202 and a second storage media device 204; at least one storage controller 206 controlling the first and second storage media devices 202 and 204; a queue 208 storing a set of commands 209 to be executed in the first or second storage media devices 202 or 204; wherein the storage controller 206: computes a first apparent load 210 associated with the first storage media device 202 as a function of the set of commands 209, a first bias associated with execution of the set of commands 209 in the first storage media device 202, and at least one time factor associated with execution of the set of commands 209 in the first storage media device 202; computes a second apparent load 212 associated with the second storage media device 204 as a function of the set of commands 209, a second bias associated with execution of the set of commands 209 in the second storage media device 204, and at least one time factor associated with execution of the set of commands 209 in the second storage media device 204; the first apparent load 210 less than the second apparent load 212 when the first bias and the second bias are set to a neutral, unbiased value indicating potential execution of said set of commands 209 in the first storage media device 202; determines a first read rate, $RR_1$, of the first storage media device 202 and a second read rate, $RR_2$, of the second storage media device 204, the second read rate, $RR_2$, greater than the first read rate, $RR_1$; positively biases 214 the second bias until the first apparent load 210 is greater than the second apparent load 212; and executes the set of commands 209 in the second storage media device 204 with higher read rate.

Figure 2B:
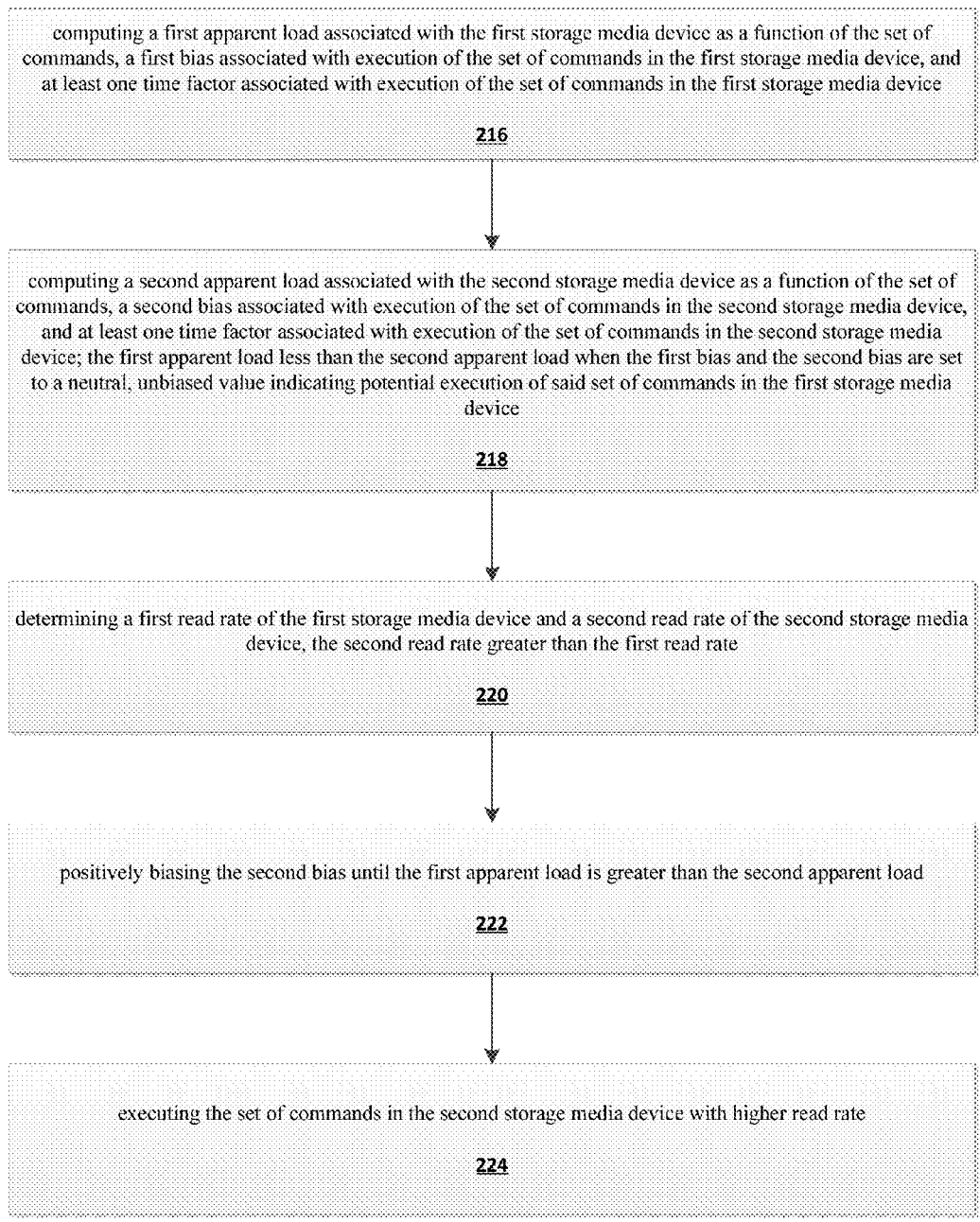

In another embodiment, as depicted in FIG. 2B, the present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device—step 216; computing a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device—step 218; determining a first read rate of the first storage media device and a second read rate of the second storage media device, the second read rate greater than the first read rate—step 220; positively biasing the second bias until the first apparent load is greater than the second apparent load—step 222; and executing the set of commands in the second storage media device with higher read rate—step 224.

In another embodiment, the present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load less than the second apparent load when the first bias and the second bias are set to a neutral, unbiased value indicating potential execution of said set of commands in the first storage media device; determine a first read rate of the first storage media device and a second read rate of the second storage media device, the second read rate greater than the first read rate; positively bias the second bias until the first apparent load is greater than the second apparent load; and execute the set of commands in the second storage media device with higher read rate.

Figure 3A:
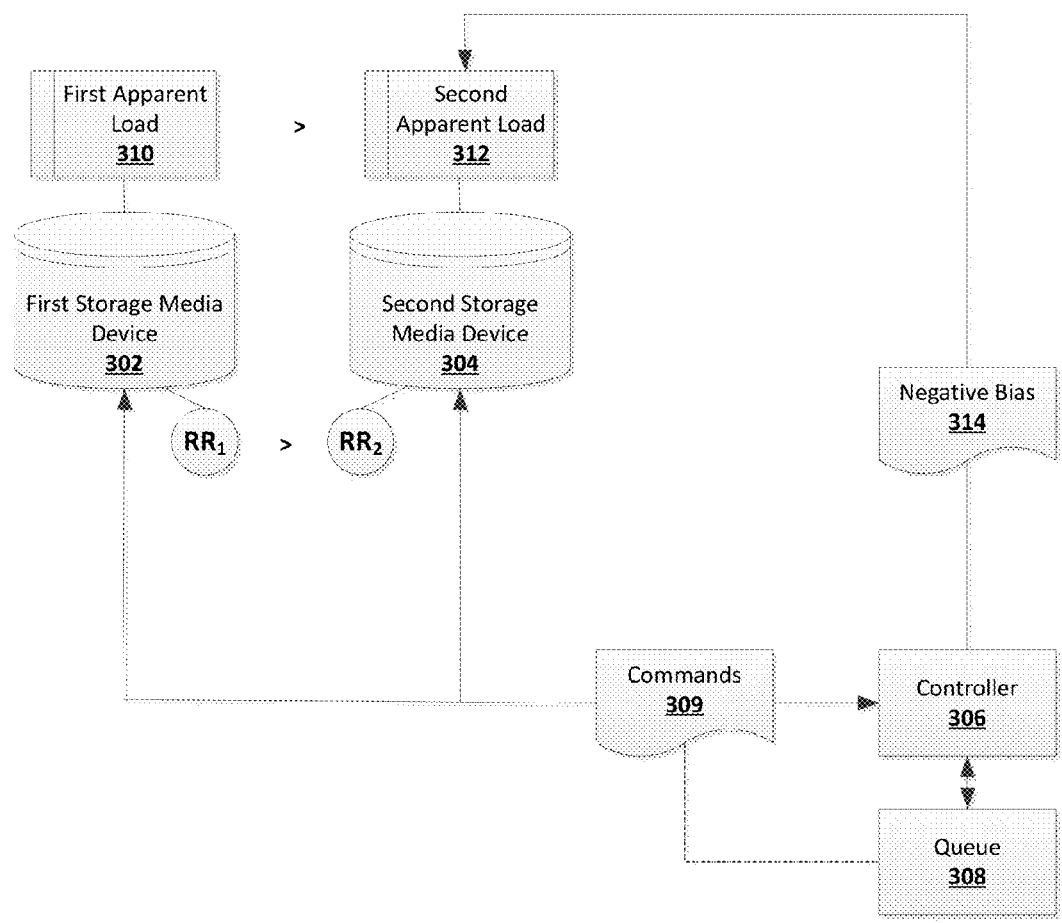

In another embodiment, as depicted in FIG. 3A, the present invention provides a storage system comprising: a plurality of storage media devices comprising at least a first storage media device 302 and a second storage media device 304; at least one storage controller 306 controlling the first and second storage media devices 302 or 304; a queue 308 storing a set of commands 309 to be executed in the first or second storage media devices 302 or 304; wherein the storage controller 306: computes a first apparent load 310 associated with the first storage media device 302 as a function of the set of commands 309, a first bias associated with execution of the set of commands 309 in the first storage media device 302, and at least one time factor associated with execution of the set of commands 309 in the first storage media device 302; computes a second apparent load 312 associated with the second storage media device 304 as a function of the set of commands 309, a second bias associated with execution of the set of commands 309 in the second storage media device 304, and at least one time factor associated with execution of the set of commands 309 in the second storage media device 304; the first apparent load 310 greater than the second apparent load 312 when the first bias and the second bias are set to a neutral, unbiased value indicating potential execution of said set of commands 309 in the second storage media device 304; determines a first read rate, $RR_1$, of the first storage media device 302 and a second read rate, $RR_2$, of the second storage media device 304, the first read rate, $RR_1$, greater than the second read rate, $RR_2$; negatively biases 314 the second bias until the second apparent load 312 is greater than the first apparent load 310; and executes the set of commands 308 in the first storage media device 302 with higher read rate.

In another embodiment, as depicted in FIG. 3B, the present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device—step 316; computing a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device—step 318; determining a first read rate of the first storage media device and a second read rate of the second storage media device, the first read rate greater than the second read rate—step 320; negatively biasing the second bias until the second apparent load is greater than the first apparent load—step 322; and executing the set of commands in the first storage media device with higher read rate—step 324.

In another embodiment, the present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determine a first read rate of the first storage media device and a second read rate of the second storage media device, the first read rate greater than the second read rate; negatively bias the second bias until the second apparent load is greater than the first apparent load; and execute the set of commands in the first storage media device with higher read rate.

Figure 4A:
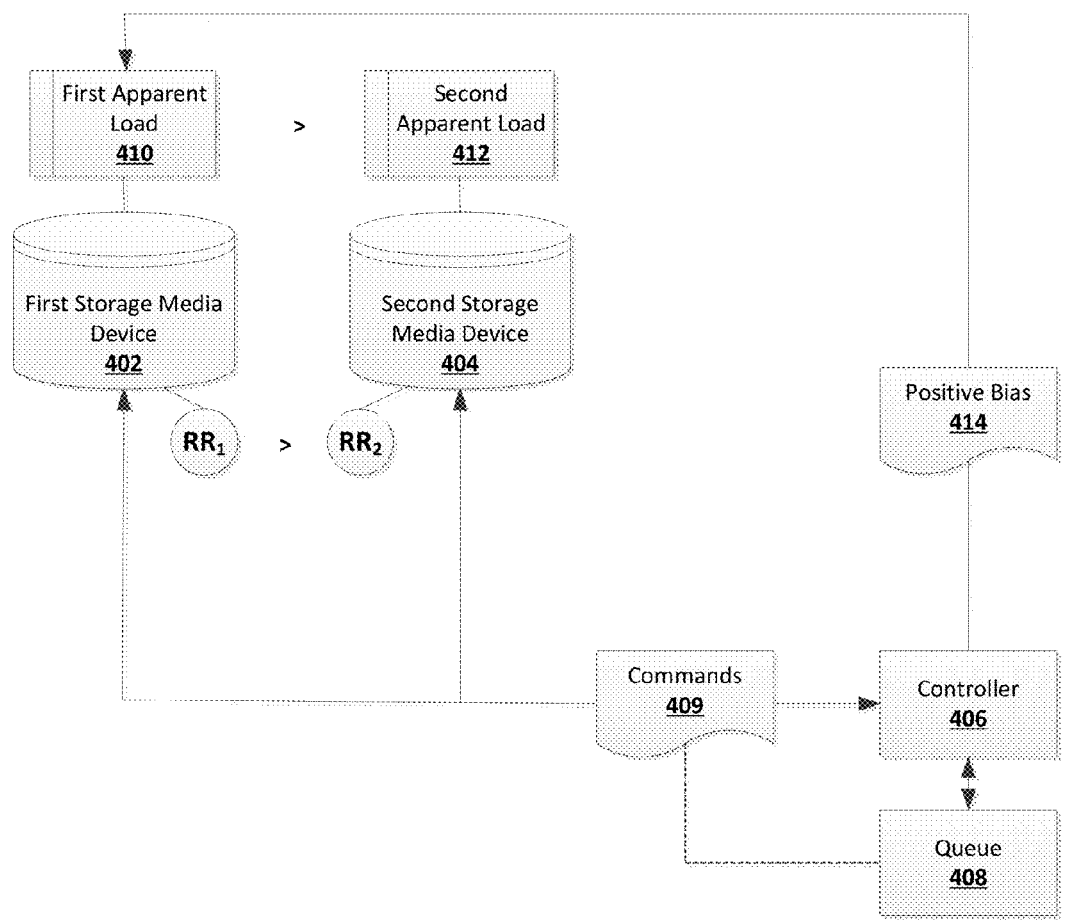

In another embodiment, as depicted in FIG. 4A, the present invention provides a storage system comprising: a plurality of storage media devices comprising at least a first storage media device 402 and a second storage media device 404; at least one storage controller 406 controlling the first and second storage media devices 402 and 404; a queue 408 storing a set of commands 409 to be executed in the first or second storage media devices 402 or 404; wherein the storage controller 406: computes a first apparent load 410 associated with the first storage media device 402 as a function of the set of commands 409, a first bias associated with execution of the set of commands 409 in the first storage media device 402, and at least one time factor associated with execution of the set of commands 409 in the first storage media device 402; computes a second apparent load 412 associated with the second storage media device 404 as a function of the set of commands 409, a second bias associated with execution of the set of commands 409 in the second storage media device 404, and at least one time factor associated with execution of the set of commands 409 in the second storage media device 404; the first apparent load 410 greater than the second apparent load 410 when the first bias and the second bias are set to a neutral, unbiased value indicating potential execution of said set of commands 408 in the second storage media device 404; determines a first read rate, $RR_1$, of the first storage media device 402 and a second read rate, $RR_2$, of the second storage media device 404, the first read rate, $RR_1$, greater than the second read rate, $RR_2$; positively biases 414 the first bias until the second apparent load 412 is greater than the first apparent load 410; and executes the set of commands 409 in the first storage media device 402 with higher read rate.

Figure 4B:
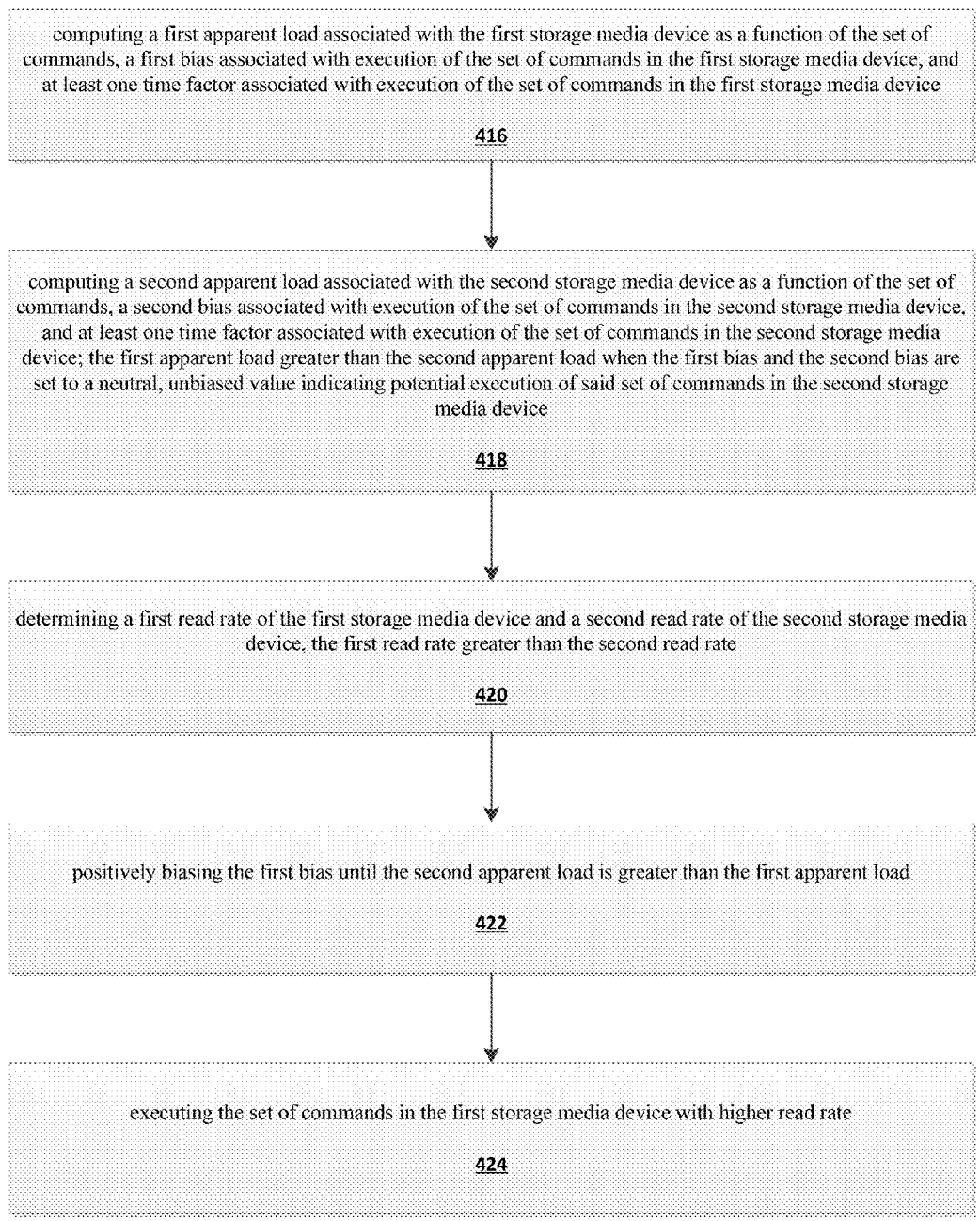

In another embodiment, as depicted in FIG. 4B, the present invention provides a method as implemented in a storage system comprising a plurality of storage media devices comprising at least a first storage media device and a second storage media device, at least one storage controller controlling the first and second storage media devices, a queue storing a set of commands to be executed in the first or second storage media devices, the method comprising: computing a first apparent load associated with the first storage media device as a function of the set of commands, a first bias associated with execution of the set of commands in the first storage media device, and at least one time factor associated with execution of the set of commands in the first storage media device—step 416; computing a second apparent load associated with the second storage media device as a function of the set of commands, a second bias associated with execution of the set of commands in the second storage media device, and at least one time factor associated with execution of the set of commands in the second storage media device;

the first apparent load greater than the second apparent load when the first bias and the second bias are set to a neutral, unbiased value indicating potential execution of said set of commands in the second storage media device—step 418; determining a first read rate of the first storage media device and a second read rate of the second storage media device, the first read rate greater than the second read rate—step 420; positively biasing the first bias until the second apparent load is greater than the first apparent load—step 422; and executing the set of commands in the first storage media device with higher read rate—step 424.

In another embodiment, the present invention provides for a non-transitory, computer accessible memory medium storing program instructions for performing a method as implemented in a storage system comprising a plurality of storage media devices comprising at least a first storage media device and a second storage media device, at least one storage controller controlling the first and second storage media devices, a queue storing a set of commands to be executed in the first or second storage media devices, wherein the program instructions are executable by a processing element to: compute a first apparent load associated with the first storage media device as a function of the set of commands, a first bias associated with execution of the set of commands in the first storage media device, and at least one time factor associated with execution of the set of commands in the first storage media device; compute a second apparent load associated with the second storage media device as a function of the set of commands, a second bias associated with execution of the set of commands in the second storage media device, and at least one time factor associated with execution of the set of commands in the second storage media device; the first apparent load greater than the second apparent load when the first bias and the second bias are set to a neutral, unbiased value indicating potential execution of said set of commands in the second storage media device; determine a first read rate of the first storage media device and a second read rate of the second storage media device, the first read rate greater than the second read rate; positively bias the first bias until the second apparent load is greater than the first apparent load; and execute the set of commands in the first storage media device with higher read rate.

It should be noted that while the specification refers to at least one storage controller, the teachings of the present invention equally apply to a plurality of storage controllers, including multiple, distributed, storage controllers. Also, while, for the sake of simplicity, the system is described as being within a chassis, it should be noted that the entire system need not be co-located within one chassis or physical location, as one or more individual elements may be located as part of a different chassis/location. Additionally, the system may also have parent and child storage controllers, where a parent storage controller makes decisions to balance across child storage controllers, who may then make decisions to balance across their child storage controllers, etc. (eventually reaching storage media devices connected to last storage controller(s) in the chain). As a non-limiting example, a storage controller may balance load across a box comprising a plurality of storage media devices, where a master storage controller may be connected to a plurality of such storage controllers to perform load balancing across a plurality of such boxes, each having a plurality of storage media devices.

In one non-limiting example, the storage media devices described in the various embodiments above may be part of a storage area network (SAN) or a network attached storage (NAS) system.

In another non-limiting example, the commands for execution in the storage media devices may be received over a network (e.g., local area network (LAN), wide area network (WAN), etc.) via a network interface.

The above-described features and applications can be implemented as software processes that are specified as a set of instructions recorded on a computer readable storage medium (also referred to as computer readable medium). When these instructions are executed by one or more processing element(s) (e.g., one or more processors, cores of processors, or other processing elements), they cause the processing element(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing element and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on/within the circuit itself. In some implementations, such as with FPGAs, software may be used to describe hardware circuits, an example of which is FPGA programming files. Such FPGA programming files may also include computer programs, machine code, microcode, firmware, and other software. The FPGA programming files may be stored within an FPGA, ASIC, computer-readable storage media, machine-readable media, or machine-readable storage media.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Those of skill in the art will appreciate that other embodiments of the disclosure may be practiced in network computing environments with many types of computer system configurations, including personal computers, hand-held devices, multi-processor systems, ASIC-based systems, FPGA-based systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of a system, method and article of manufacture for monitoring, controlling, and improving storage media system performance based on a read rate of storage media devices. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A storage system comprising:
a plurality of storage media devices comprising at least a first storage media device and a second storage media device;
at least one storage controller controlling said first and second storage media devices;
a queue storing a set of commands to be executed in said first or second storage media devices;
wherein said storage controller:
computes a first apparent load associated with said first storage media device as a function of said set of commands, a first bias associated with execution of said set of commands in said first storage media device, and at least one time factor associated with execution of said set of commands in said first storage media device;
computes a second apparent load associated with said second storage media device as a function of said set of commands, a second bias associated with execution of said set of commands in said second storage media device, and at least one time factor associated with execution of said set of commands in said second storage media device;
said first apparent load less than said second apparent load when said first bias and said second bias are set to a neutral, unbiased value indicating potential execution of said set of commands in the first storage media device;

determines a first read rate of said first storage media device and a second read rate of said second storage media device, said second read rate greater than said first read rate;
negatively biases said first bias until said first apparent load is greater than said second apparent load; and
executes said set of commands in said second storage media device with higher read rate.

2. The storage system of claim 1, wherein said storage system is part of a storage area network (SAN).

3. The storage system of claim 1, wherein said storage system is part of a network attached storage (NAS).

4. The storage system of claim 1, wherein said system further comprises a network interface, and wherein at least one command in said set of commands is received via said network interface over at least one network.

5. The storage system of claim 4, wherein said at least one network is any of, or a combination of, the following: local area network (LAN) or wide area network (WAN).

6. The storage system of claim 1, wherein apparent load of a given storage media device is computed as follows:

$$\sum_{i=0}^{N} \frac{M_i * Bias_i}{QueueCapacity}$$

for N commands in said queue
where $$M = \frac{RequiredSeekTime}{T_{min}} + \frac{T_{cmd}}{T_{min}};$$

and
where $T_{min}$=minimal time possible for any single command for that given storage media device, from issuance to completion, $T_{cmd}$=time for a specific command to issue, from issuance to completion, QueueCapacity=maximum number of commands that said queue can hold, Bias=the desired artificial influence applied to each command, and RequiredSeekTime=estimated or actual storage media device seek time.

7. A storage system comprising:
a plurality of storage media devices comprising at least a first storage media device and a second storage media device;
at least one storage controller controlling said first and second storage media devices;
a queue storing a set of commands to be executed in said first or second storage media devices;
wherein said storage controller:
computes a first apparent load associated with said first storage media device as a function of said set of commands, a first bias associated with execution of said set of commands in said first storage media device, and at least one time factor associated with execution of said set of commands in said first storage media device;
computes a second apparent load associated with said second storage media device as a function of said set of commands, a second bias associated with execution of said set of commands in said second storage media device, and at least one time factor associated with execution of said set of commands in said second storage media device;

said first apparent load less than said second apparent load when said first bias and said second bias are set to a neutral, unbiased value indicating potential execution of said set of commands in the first storage media device;

determines a first read rate of said first storage media device and a second read rate of said second storage media device, said second read rate greater than said first read rate;

positively biases said second bias until said first apparent load is greater than said second apparent load; and executes said set of commands in said second storage media device with higher read rate.

8. The storage system of claim 7, wherein said storage system is part of a storage area network (SAN).

9. The storage system of claim 7, wherein said storage system is part of a network attached storage (NAS).

10. The storage system of claim 7, wherein said system further comprises a network interface, and wherein at least one command in said set of commands is received via said network interface over at least one network.

11. The storage system of claim 10, wherein said at least one network is any of, or a combination of, the following: local area network (LAN) or wide area network (WAN).

12. The storage system of claim 7, wherein apparent load of a given storage media device is computed as follows:

$$\sum_{i=0}^{N} \frac{M_i * Bias_i}{QueueCapacity}$$

for N commands in said queue
where $$M = \frac{RequiredSeekTime}{T_{min}} + \frac{T_{cmd}}{T_{min}};$$

and
where $T_{min}$=minimal time possible for any single command for that given storage media device, from issuance to completion, $T_{cmd}$=time for a specific command to issue, from issuance to completion, QueueCapacity=maximum number of commands that said queue can hold, Bias=the desired artificial influence applied to each command, and RequiredSeekTime=estimated or actual storage media device seek time.

13. A method as implemented in a storage system comprising a plurality of storage media devices comprising at least a first storage media device and a second storage media device, at least one storage controller controlling said first and second storage media devices, a queue storing a set of commands to be executed in said first or second storage media devices, said method comprising:

computing a first apparent load associated with said first storage media device as a function of said set of commands, a first bias associated with execution of said set of commands in said first storage media device, and at least one time factor associated with execution of said set of commands in said first storage media device;

computing a second apparent load associated with said second storage media device as a function of said set of commands, a second bias associated with execution of said set of commands in said second storage media device, and at least one time factor associated with execution of said set of commands in said second storage media device;

said first apparent load less than said second apparent load when said first bias and said second bias are set to a neutral, unbiased value indicating potential execution of said set of commands in the first storage media device;

determines a first read rate of said first storage media device and a second read rate of said second storage media device, said second read rate greater than said first read rate;

negatively biasing said first bias until said first apparent load is greater than said second apparent load; and executing said set of commands in said second storage media device with higher read rate.

14. The method of claim 13, wherein said storage system is part of a storage area network (SAN).

15. The method of claim 13, wherein said storage system is part of a network attached storage (NAS).

16. The method of claim 13, wherein at least one command in said set of commands is received via a network interface over at least one network.

17. The method of claim 16, wherein said at least one network is any of, or a combination of, the following: local area network (LAN) or wide area network (WAN).

18. The method of claim 13, wherein apparent load of a given storage media device is computed as follows:

$$\sum_{i=0}^{N} \frac{M_i * Bias_i}{QueueCapacity}$$

for N commands in said queue
where $$M = \frac{RequiredSeekTime}{T_{min}} + \frac{T_{cmd}}{T_{min}};$$

and
where $T_{min}$=minimal time possible for any single command for that given storage media device, from issuance to completion, $T_{cmd}$=time for a specific command to issue, from issuance to completion, QueueCapacity=maximum number of commands that said queue can hold, Bias=the desired artificial influence applied to each command, and RequiredSeekTime=estimated or actual storage media device seek time.

* * * * *